Patented Nov. 3, 1942

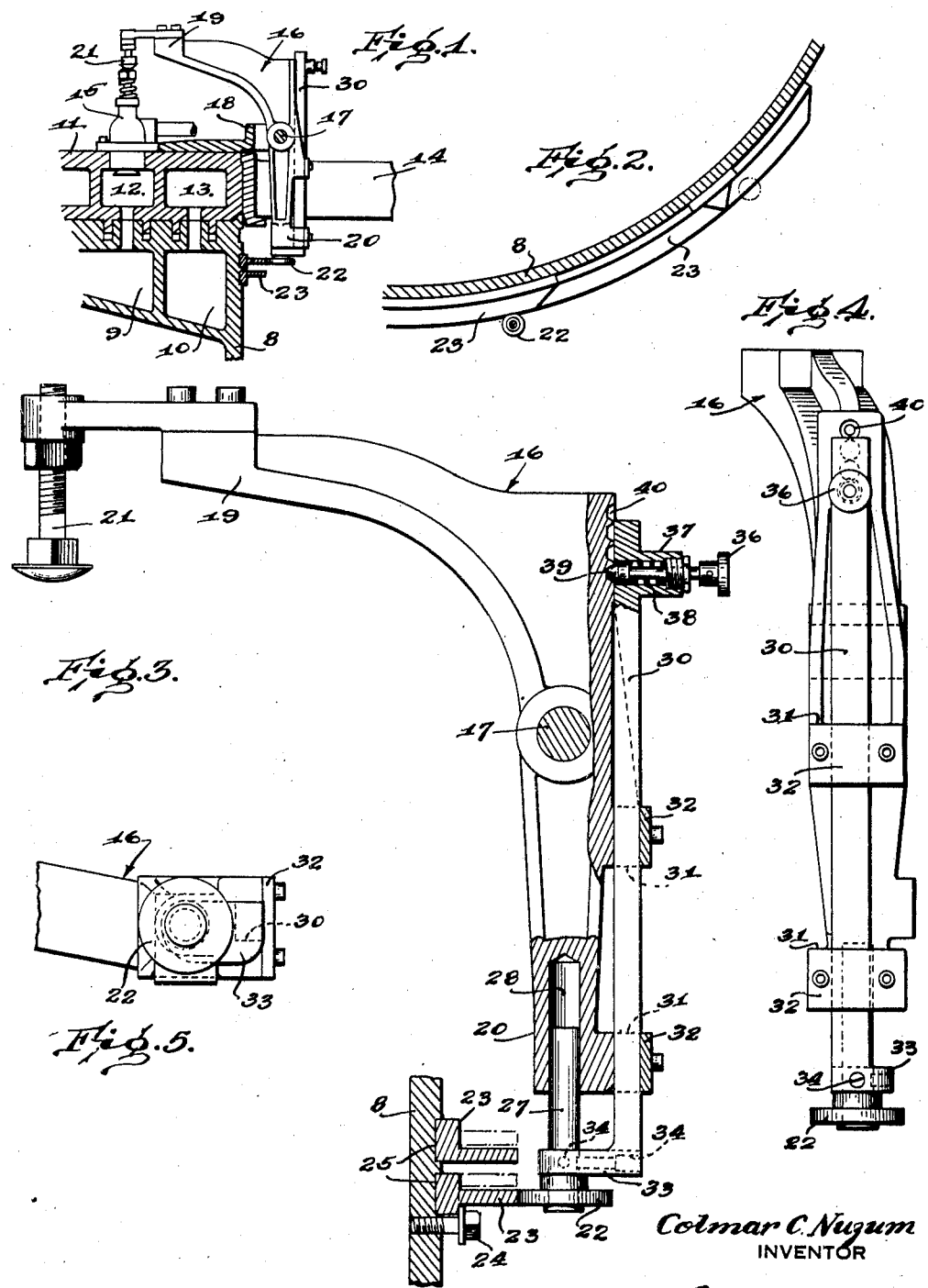

2,301,139

UNITED STATES PATENT OFFICE 2,301,139

BLOWING AIR CONTROL FOR GLASSWARE FORMING MACHINES

Colmar C. Nuzum, Fairmont, W. Va., assignor to Owens-Illinois Glass Company, a corporation of Ohio Application November 4, 1940, Serial No. 364,109

3 Claims. (Cl. 74—569)

The present invention relates to improvements in automatic bottle blowing machines and is directed in particular to mechanism for controlling the blowing air therefor.

An object of the invention is the provision of means for adjustably controlling the flow of compressed air to the finishing or blow molds of a glassware forming machine.

Another object is the provision of novel means for selecting the point of opening of the blowing air valve.

A further object is the provision of a series of cams adapted to variably regulate the cycle of blowing operation.

Other objects will be in part apparent and in part pointed out hereinafter.

In the manufacture of blown glass articles such as bottles and jars or the like, the blanks or parisons from which the articles are produced, are expanded to final form in finishing molds by introducing air under pressure to the interior of the blanks. Reference may be had to Patent #1,185,687 to La France dated June 6, 1916, for a complete disclosure of a standard Owens type glassware forming machine of which my invention may well form a part. Generally, a machine of this type includes a stationary central column about which a circular mold table or carriage is adapted to be continuously rotated. Ware forming mold groups each comprising blank or parison molds, neck molds, and finishing or blow molds are supported on the carriage and operated mechanically by means of stationary cams carried by the central column. Vacuum and air under pressure for gathering and finally forming the article in the mold is supplied through a distributor, a part of which is formed within the upper end of the stationary column. The rotating portion of the distributor is connected to the mold carriage for rotation therewith and carries vacuum control mechanism and an air valve unit with which the present invention is identified.

In the drawing:

Fig. 1 is a vertical sectional view illustrating my invention in connection with the air and vacuum distributor of a glassware forming machine.

Fig. 2 is a partial plan view of the blowing control cams for the several heads.

Fig. 3 is a side elevational view of the blowing air valve lever.

Fig. 4 is a front elevational view of the lever; and

Fig. 5 is an end elevational view thereof.

In the forming of glassware on machines of the above type, certain standards of operation have been developed. Proper cam settings determined from previous runs of articles having the same or nearly the same shape and weight may be made before the machine is started. During the running of the machine, various minor adjustments may be required in order to produce ware of the highest quality. One important adjustment necessary to finally completing an article is that of regulating the blowing time in order that air may be introduced into the finishing mold after the parison has been sufficiently reheated following the transfer thereto. For this reason the point of opening of the blow air valve is set approximately by previous calculations so that only minor adjustments may be necessary for satisfactory operation of the machine. In order to readily and easily make such adjustments while the machine is running, various changes have been made in the construction of the blow air mechanism, as illustrated in the accompanying drawing.

Referring to Fig. 1, the central stationary column 8 of a glassware forming machine is provided at its upper end with concentrically arranged chambers 9 and 10 to which air under pressure and vacuum respectively are supplied from suitable sources. A ring 11 having chambers 12 and 13 formed therein, and communicating with the chambers 9 and 10, is rotatively supported on the upper end of the column 8. The ring is connected to the mold supporting carriage by an upper spider 14 by which it is rotated during operation of the machine.

Each mold group is provided with an air valve 15 bolted to the ring 11 and forming an outlet for the air pressure chamber 12. A valve operating lever 16 forming the subject of the present application is pivoted on a horizontal hinge pin 17 to a bracket 18 which projects outwardly from and is secured to the ring 11. The lever is shaped in the form of a bell crank, one end 19 or arm of which projects upwardly and inwardly from the hinge pin for engagement with the valve 15 and the other end 20 or arm thereof extends downwardly substantially parallel with the wall of the central column 8. A threaded screw 21 carried by the inner end of the lever, may be adjusted to regulably control opening of the valve as the lever is operated.

A roller 22 carried at the lower end 20 of the lever is adapted to engage one of a series of arcuate cams 23 which may be held by means of bolts 24 in grooves 25 formed in the column 8, The cams are arranged one over the other and may be adjusted lengthwise in the grooves to vary the starting point of the several fabricating operations.

Means for adjusting the roller to the height of the selected cam includes a bearing pin 27 on the lower end of which the roller is mounted. This pin extends upwardly and is slidingly received in a vertical bore 28 or guideway in the arm 29 of the lever. The roller is held at the selected position by means of a slide bar 30 which extends vertically between ears 31 formed on the outer side of the lever and held by retaining plates 32 bolted to the ears. These ears and plates provide guides for the bar 30. The lower end of the bar is provided with an inwardly extending arm 33 through which the pin 27 passes and in which it is held by set screws 34. Thus, vertical movement of the slide bar results in raising or lowering the roller.

Means for releasably locking the slide bar in any adjusted position includes a detent plunger 36 supported in an outwardly projecting boss 37 formed on the upper end of the bar. A coil spring 38 surrounding the plunger within the boss exerts holding pressure for maintaining the tip 39 of the plunger seated in one of a longitudinal series of depressions 40 in the lever. The plunger may be withdrawn at any time even during the running of the machine and the bar raised or lowered as desired.

During normal operation of a glassware forming machine, conditions at times will cause certain molds to run at a higher temperature than others so that the glass will be hotter and more plastic when the transfer to the finishing mold is completed. When such a condition exists, it is necessary to vary the point at which the blowing air is introduced into the blank in order that the parison will be properly expanded. This may be accomplished by moving the cam roller 22 into engagement with another of the cams 23 which has been previously set to remedy such a condition and is indicated in Fig. 2.

Modifications may be resorted to within the spirit and scope of the appended claims.

I claim:

1. In apparatus of the character described, a pivoted bell crank lever having one arm engageable with a normally spring closed valve and its other arm positioned for contact with a stationary cam, said lever adapted for movement relative to the cam, a series of vertically spaced stationary cams adjacent said other arm, a cam roller adjacent and below said other arm for contact with one of the cams, a pin carrying said roller and slidingly telescoped into the lower end of said other arm, and manually operable means for imparting axial movement to the pin and roller and releasably locking them in any adjusted position.

2. In apparatus of the character described, a pivoted bell crank lever having one arm engageable with a normally spring closed valve and its other arm positioned for contact with a stationary cam, said lever adapted for movement relative to the cam, a series of vertically spaced stationary cams adjacent said other arm, a cam roller adjacent and below said other arm for contact with one of the cams, a pin carrying said roller and slidingly telescoped into the lower end of said other arm, and manually operable means for imparting axial movement to the pin and roller and releasably locking them in any adjusted position, said last named means comprising a slide bar carried by and disposed longitudinally of said other arm and connected at one end to the pin, and a spring pressed detent carried by the slide bar and adapted to releasably secure said bar and roller in any adjusted position.

3. In apparatus of the character described, a pivoted bell crank lever having one arm engageable with a normally spring closed valve and its other arm positioned for contact with a stationary cam, said lever adapted for movement relative to the cam, a series of vertically spaced stationary cams adjacent said other arm, a cam roller adjacent and below said other arm for contact with one of the cams, a pin carrying said roller and slidingly telescoped into the lower end of said other arm, and manually operable means for imparting axial movement to the pin and roller and releasably locking them in any adjusted position, said last named means comprising a slide bar extending longitudinally of said other arm and slidingly mounted thereupon, means connecting the lower end of said bar and the aforementioned pin, said lever having a longitudinal series of recesses facing a portion of the slide bar and a spring pressed detent carried by the slide bar and adapted to cooperate with said recesses one at a time in releasably holding the cam roller in any adjusted position.

COLMAR C. NUZUM.